Patented July 12, 1927.

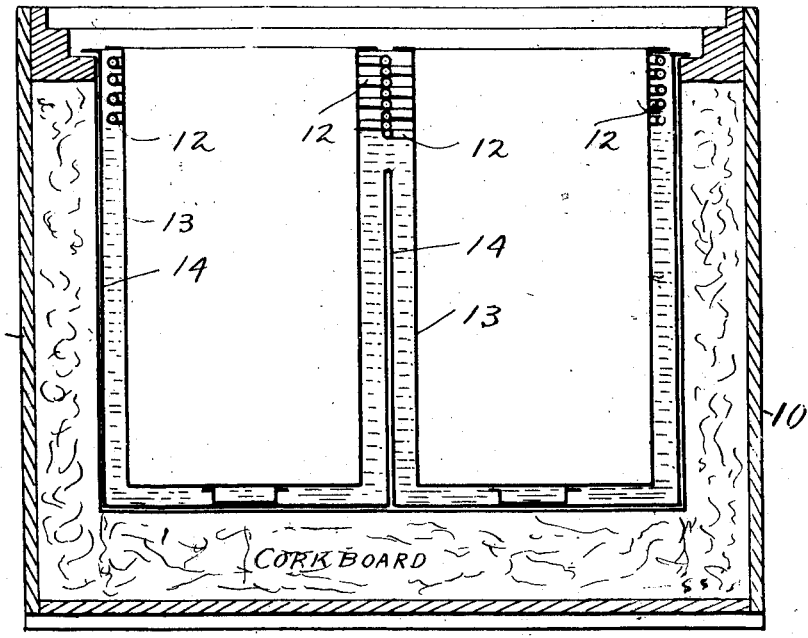
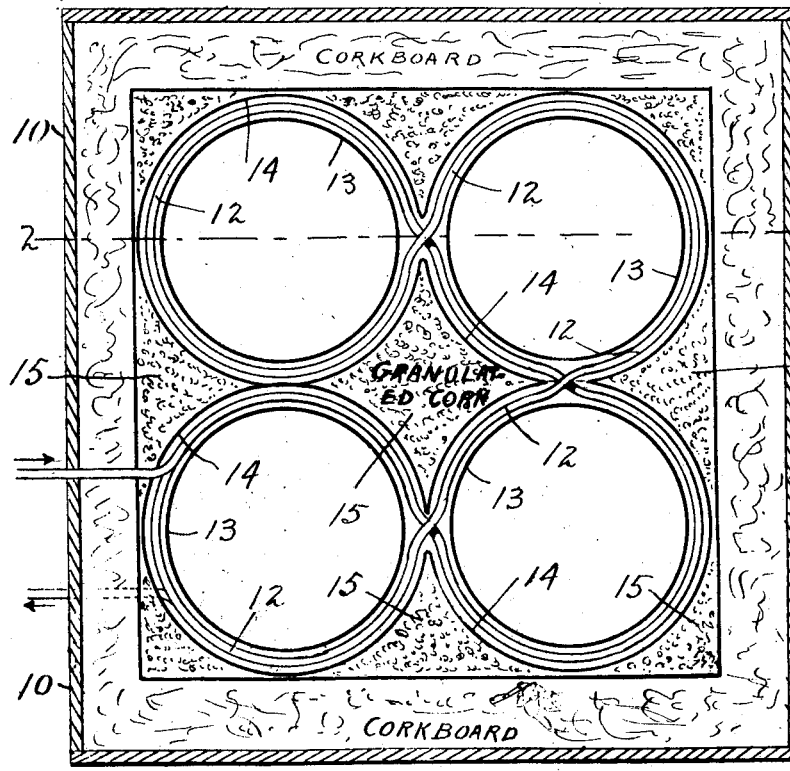
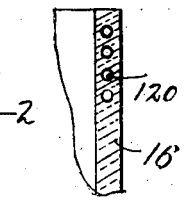

1,635,962

UNITED STATES PATENT OFFICE.

CHARLES D. RYDER AND CHARLES F. MOORES, OF NEW YORK, N. Y.; SAID RYDER ASSIGNOR TO ROTARY REFRIGERATION, INCORPORATED, OF NEW YORK, N. Y., A CORPORATION.

ICE-CREAM CABINET.

Application filed January 2, 1925. Serial No. 291.

In stores and cafes and other places where ice cream is sold, cabinets are used having compartments for the containers and crushed ice packed around the containers. The use of ice for this purpose is being discontinued in favor of apparatus of the condenser-expansion gas type, and to discard the great number of such cabinets that are now in use, would result in great financial loss. The object of our invention is to utilize these old ice-using cabinets and to do so without loss of efficiency, in protecting their contents from heat absorption,—indeed our invention results in a larger increase of efficiency of the cabinets than when ice is used. Our invention consists in whatever is described by or is included within the terms or scope of the claims hereinafter appearing as required by the statute.

In the drawings:

Fig. 1 is a horizontal section of an ice-using cabinet arranged with one embodiment of our invention;

Fig. 2 is a vertical section on line 2—2 of Fig. 1;

Fig. 3 is a fragmentary view showing another embodiment of our invention.

The ice using cabinet has, of necessity, a large space around the ice cream container to accommodate the large quantity of ice that is required and such a cabinet is shown in Figs. 1 and 2. Its hollow walls are packed with an insulator of heat.

We use precisely the same cabinet, 10, having the packed external walls and in the space between such walls and the ice-cream container, we place the expansion coil of the refrigerating apparatus, the coil having a diameter just large enough to surround or encircle the container, and as shown in Figs. 1 and 2 we place such coil, 12, in a metal shell or sleeve formed of concentric walls, 13 and 14, spaced apart just enough to receive the coil, and in the space between such walls, is placed brine that submerges or envelops the coil, and in the spaces left between the sleeve and the external walls of the cabinet and between the sleeves we place a filling, 15, of cork or other heat insulator. Thus, the ice-cream container is surrounded by the coil in the brine, a body of insulation between the coil and the external walls of the cabinet, and by the insulator-containing cabinet walls.

Instead of having the expansion coil in the brine container, it may as shown in Fig. 3 be embedded in a wall, 16, of soapstone, made of ground or powdered soapstone and a suitable binder, moulded around the coil, 120, the wall, 16, being of a thickness just enough to enclose the coil.

Referring to Fig. 1, it will be seen that the pipe forming the coil, 12, passes in a serpentine or sinuous course around the group of cylinders, and speaking with reference to the direction of in-flow of the fluid, passes partially around one cylinder after the other in succession until the last cylinder, and then completely encircling the latter is passed, speaking with reference to the return flow of the fluid, in the opposite direction partially around each of the other cylinders, the result being that as to the first cylinder, speaking with reference to the direction of in-flow through the coil, the fluid in its coldest and warmest state is flowing about the same upon opposite sides thereof, and the fluid temperature around the remotest cylinder is a medium temperature and the fluid temperature around the intermediate cylinder compensatingly differs upon opposite portions thereof, so that the mean temperature about all of the cylinders of the group is about the same. With such arrangements of coils for a group of cylinders, as we are familiar with which provide a cold producer in the middle of the group, there exists a difference of from 5 to 8 degrees of temperature between the cylinders lying near the cold producer and those remote from the same with the result that the cylinders next to the cold producer are too cold or the cylinders farthest away are too warm for proper ice cream serving.

Another important feature of our invention resides in the thin shell or film of brine around the container of ice cream by reason of the close spacing of the concentric walls, 13 and 14. As compared with other constructions known to us, this thin wall or film of brine reduces the time for cooling down brine very substantially, as much as 90 percent, due to the fact that the volume of brine is about five gallons, instead of sixty gallons. With the ice cream cabinet referred to, and with which we are conversant, it takes from 48 to 72 hours according to the natural temperature to cool brine down from its in-coming temperature to the proper temperature for ice cream, while with our construction it takes only about one-tenth that time. Since the exigencies of the demand for ice cream require speedy lowering of the brine temperature to place the ice cream in the proper condition of hardness, the great value of rapid lowering of the temperature of the brine will be appreciated.

We claim:

1. A refrigerator cabinet having a refrigerant receiving chamber surrounding a container of substance to be kept at low temperature, a coil closely surrounding such container and spaced a substantial distance from the interior of the cabinet walls, and a heat insulating material situated in the space between such chamber and the cabinet walls.

2. A refrigerator cabinet having a plurality of containers for substances to be kept at low temperature, and cooling coils concentric with each container extending from one container to another with portions of coils arranged for the flow of cooling medium upon opposite sides of the container whereby the mean temperature about the various containers is substantially the same, the inlet and outlet portions of said coils being upon opposite sides of one of the containers whereby the cooling medium at extremes of temperature will be adjacent such container.

3. A refrigerator cabinet having a refrigerant receiving chamber surrounding a container of substance to be kept at low temperature, said container comprising a shell composed of comparatively closely spaced concentric walls about such container, and means for passing a cooling medium through the space between such concentric walls.

4. A refrigerator cabinet having a plurality of containers for substances to be kept at low temperature by the action of a flowing cooling medium, means comprising an inlet and an outlet for such cooling medium situated on opposite sides of one of the containers whereby the cooling medium at extremes of temperature will be adjacent such container, and for directing flow of such cooling medium to and about the exterior of each of the other containers in succession from said inlet and from the last container to the outlet adjacent the first container.

In testimony whereof we hereunto affix our signatures.

CHARLES D. RYDER.
CHARLES F. MOORES.